United States Patent [19]

Policastro et al.

[11] Patent Number: 5,039,454
[45] Date of Patent: Aug. 13, 1991

[54] ZINC-CONTAINING MAGNESIUM OXYCHLORIDE CEMENTS PROVIDING FIRE RESISTANCE AND AN EXTENDED POT-LIFE

[76] Inventors: Peter P. Policastro, 3648 High Pine Dr., Coral Springs, Fla. 33065; Raj S. Tarneja, 5490 W. 7th Ave., Hialeah, Fla. 33012

[21] Appl. No.: 524,311

[22] Filed: May 17, 1990

[51] Int. Cl.$^5$ .............................................. C09K 21/00
[52] U.S. Cl. ................................ 252/610; 252/601; 264/4.3; 106/18.11; 106/18.2; 106/685; 106/686; 428/245; 501/124
[58] Field of Search ................. 252/601, 610; 264/4.3; 106/18.11, 685, 686, 18.2; 428/245; 501/124

[56] References Cited

U.S. PATENT DOCUMENTS

| 3,084,639 | 4/1974 | Trulsson et al. | 106/1 |
| 3,944,515 | 3/1976 | Foley et al. | 260/38 |
| 4,040,842 | 8/1977 | Mekishima et al. | 106/1 |
| 4,144,074 | 3/1979 | Itoh et al. | 106/1.17 |
| 4,347,285 | 8/1982 | Batdorf | 428/332 |
| 4,572,862 | 2/1986 | Ellis | 428/245 |
| 4,661,398 | 4/1987 | Ellis | 428/245 |
| 4,818,595 | 4/1989 | Ellis | 428/245 |

Primary Examiner—Robert L. Stoll
Assistant Examiner—N. Bhat
Attorney, Agent, or Firm—Finnegan, Henderson, Farabow, Garrett & Dunner

[57] ABSTRACT

A fire barrier composition in the form of a zinc-containing magnesium oxychloride cement is described. The composition exhibits a prolonged pot-life as well as reduced thermal popping when applied to a substrate as a coating. The fire barrier composition can be used for rendering a flammable substrate fire resistant and for encapsulating lead paint.

26 Claims, No Drawings

ZINC-CONTAINING MAGNESIUM OXYCHLORIDE CEMENTS PROVIDING FIRE RESISTANCE AND AN EXTENDED POT-LIFE

BACKGROUND OF THE INVENTION

This invention relates to a fire barrier composition, to a method of using the fire barrier composition in which a flammable substrate is coated with the composition to protect the substrate from fire, and to a method for encapsulating lead paint using the composition of this invention.

Numerous methods have been developed for protecting objects from fire. The rationale for each of these methods is found in the physics of combustion, the chemistry of flame, and the engineering of fire control systems. Many of these methods involve the use of fire protective coatings forming a barrier system intended to prevent the ignition and spread of flame on a combustible substrate.

Four types of fire protective coatings are known: (1) ablative; (2) intumescent; (3) sublimation and gas- or vapor-producing; and (4) "ceramic" or inorganic. Ablative coatings are generally thick, heavy, and costly, thus limiting their application to special uses. Intumescent coatings are generally soft and easily abraded and have a limited duration of protection—10 to 15 minutes when exposed to fire. Sublimative or gas-producing coatings have an even shorter duration of protection—after the fire retardant gases have been produced and wafted away from the surface, the flammable substrate is left without a protective mechanism. Such coatings have found their major use in the treatment of fibers and clothing. Ceramic coatings, as the name implies, require high temperature curing in order to form a ceramic bond. Unfortunately, many structural or building components cannot withstand this treatment. Inorganic coatings, such as Portland cement, gypsum, calcium aluminate cement, phosphate-bonded cement, metal-pigment loaded silicate coatings, high-temperature silicone, and magnesium "oxysalt" cements, have also been proposed.

A commonly used fireproofing coating is derived from a magnesium oxychloride cement. This cement is made by mixing magnesium chloride and magnesium oxide with other materials to form a viscous, cementitious mixture that can be applied to the surface of the object to be fireproofed. Unfortunately, some magnesium oxychloride coatings, as well as fireproofing coatings derived from other oxysalt cements, have significant shortcomings. For example, these cements tend to be brittle, rigid, and susceptible to spalling or decrepitating under heat. The coatings also exhibit poor aging and weatherability characteristics. In addition, there is a loss of tensile strength and cohesiveness after exposure to flame.

Thus, an ideal flame-retardant coating should be quick-setting, non-combustible, and capable of protecting a variety of susceptible flammable substrates from ignition, while overcoming the above-listed shortcomings observed previously. It has recently been found that a magnesium oxychloride cement cobonded with a high alumina calcium aluminate cement and a colloidal silica fulfills some of these needs in the art. Such a composition, in the form of a thin paint, does not spall, decrepitate or crack significantly under direct flame impingement and exhibits an adequate tensile and cohesive strength for the duration of a fire. In addition, this cement has all of the properties of a good paint exhibiting excellent adhesion properties to a wide range of substrates.

While this fireproofing cement represents a major step forward in meeting many of the needs in the art, there exists a need to modify the properties of the composition to suit certain applications. The pot-life of the cement is inconveniently short for some industrial and commercial applications; after mixing the components together, the viscosity of the mixture increases rapidly, rendering it unworkable after 15 to 20 minutes. Additionally, some decrepitation has been noted when a flame is rapidly and directly impinged on the coating.

As the batch-size of a composition is limited to the quantity that can be applied to a substrate during its pot-life, a longer pot-life increases the efficiency with which the coating can be applied. Therefore, there exists a need in the art for a magnesium oxysalt flame retardant coating that exhibits a significantly longer pot-life. Ideally, the coating should also be more resistant to decrepitation upon direct flame impingement.

In addition to the flame retardant properties of a magnesium oxysalt coating, there exists other divergent needs in the art that such a coating could aid in fulfilling. For example, it is well known that lead-based paints present serious health dangers to small children. Consequently, there is a need to encapsulate such paints. The encapsulating agent should be a virtually impenetrable barrier that is not compromised even under the harshest conditions.

SUMMARY OF THE INVENTION

This invention aids in fulfilling these needs in the art by providing a fluid, substantially homogenous aqueous mixture comprising magnesium oxide, magnesium chloride in an amount sufficient to form a magnesium oxychloride cement with the magnesium oxide, a zinc-containing compound in an amount sufficient to impart a pot-life of about 1 hour to about 6 hours to the mixture, and water. In specific embodiments of this invention the zinc-containing compound is selected from the group consisting of zinc acetate, zinc benzoate, zinc chloride, zinc formate, zinc oxide, zinc silicate, and zinc phosphate.

In a preferred embodiment the magnesium oxide is present in the mixture of the invention in an amount of about 20 parts to about 60 parts by weight of the mixture, the magnesium chloride is in the form of an aqueous solution having a specific gravity of about 1.19 g/ml to about 1.35 g/ml, this magnesium chloride solution is present in the mixture in an amount of about 60 parts to about 100 parts by weight of the mixture, and the zinc-containing compound is present in the mixture from about 1 to about 60 parts by weight of the mixture. In a most preferred embodiment the magnesium oxide is present in the mixture of the invention from about 35 to about 45 parts by weight of the mixture, the magnesium chloride is in the form of an aqueous solution having a specific gravity of about 1.19 to about 1.35 g/ml, the magnesium chloride solution is present in the mixture from about 70 to about 90 parts by weight of the mixture, and the zinc-containing compound is present in an amount of about 20 to about 50 parts by weight of the mixture.

The invention also provides a fluid, substantially homogenous aqueous mixture comprising magnesium oxide, magnesium chloride in an amount sufficient to form a magnesium oxychloride cement with the magnesium oxide, a zinc-containing compound, and water. The zinc-containing compound is present in an amount sufficient to significantly reduce the amount of thermal popping after the mixture has been applied to substrate and cured on the substrate. In a preferred embodiment, the invention provides a fluid, substantially homogenous aqueous mixture comprising magnesium oxide, magnesium chloride in an amount sufficient to form a magnesium oxychloride cement with the magnesium oxide, a zinc-containing compound in an amount sufficient to obtain a value of "3" in a thermal shock test after being applied to substrate at about 20 mils dry thickness and allowed to cure under ambient conditions for a period of about 2 weeks, and water.

The invention also provides a method for rendering materials fire resistant comprising applying the mixture of the invention to a material to be rendered fire resistant and curing the composition to form a solid, cementitious composition.

The invention further provides a method for encapsulating a lead paint, wherein the method comprises applying the mixture of the invention over a lead-containing paint to be encapsulated and curing the mixture to form a solid, cementitious composition.

DETAILED DESCRIPTION OF THE PREFERRED EMBODIMENT

The method of this invention is useful for rendering materials fire resistant by applying a fluid, substantially homogeneous, aqueous mixture to the material to be rendered fire resistant. The mixture is comprised of an opaque, cementitious, magnesium oxychloride solution in admixture with a zinc-containing compound. The term "magnesium oxychloride" is used herein to refer to the products formed upon mixing magnesium chloride, magnesium oxide, and water in amounts that form a solid cementitious mass after curing. The term "opaque" is used herein in its conventional sense to indicate a material that is not pervious to visible light. The term "cementitious" is also used in its conventional sense to indicate a material that exhibits the properties, especially the solution and adhesion properties, of a cement.

More specifically, the composition of this invention comprises magnesium oxide, magnesium chloride, and a zinc-containing compound. As used herein, the terms "magnesium chloride" and "magnesium oxide" are used to refer to $MgCl_2 \cdot nH_2O$ and $MgO$, respectively, in any standard water soluble crystalline form and in any hydration state. Thus, the term "magnesium chloride" encompasses both the unhydrated form ($MgCl_2$) and the hexahydrate form ($MgCl_2 \cdot 6H_2O$) of this compound.

The zinc-containing compound employed in the invention can be any inorganic zinc-containing compound. In embodiments of this invention, the inorganic zinc-containing compound has the structure $ZnX_2$, where X is a halide, such as Cl, Br, I, or F. In other embodiments the inorganic zinc-containing compound is zinc oxide or a compound of the structure $Zn_aY_b$, wherein Y is a chemical moiety containing phosphorous, silicon, or boron and a heteroatom such as oxygen or sulfur, and wherein a is 1, 2, or 3, and b is 1 or 2. As used herein a "chemical moiety" is an atom or a group of associated atoms that tend to remain together during a reaction (i.e., a chemical group). Examples of a chemical moiety include, but are not limited to, phosphate, silicate, and borate. Consequently, in specific embodiments of this invention the inorganic zinc containing compound can include, but is not limited to, any of the following compounds either alone or in admixture: zinc chloride, zinc oxide, zinc silicate, zinc borate, and zinc phosphate, all either in an anhydrous or hydrated state. The term "zinc phosphate" comprises both zinc orthophosphate and zinc pyrophosphate. The term "zinc orthophosphate" includes zinc orthophosphate in any hydration state and in any crystalline state, such as the dihydrogen, octahydrate, and the tetrahydrate forms. Tetrahydrated zinc orthophosphate can be either the α-Hopeite, β-Hopeite, or Para-Hopeite forms.

The zinc-containing compound employed in the invention can also be any zinc-containing organo-metallic compound. In embodiments of this invention, the zinc-containing compound is an organo-metallic compound of the structure $Zn(O_2CR)_2$ where R is H, a $C_1$ to $C_4$ alkyl group, or a phenyl group. In specific embodiments of this invention the zinc-containing compound includes, but is not limited to, the following organo-metallic compounds either alone or in admixture: zinc formate, zinc acetate, and zinc benzoate.

The presence of a zinc-containing compound in a magnesium oxychloride cement was unexpectedly found to improve the fire resistance properties of a substrate coated with this composition. In addition, the incorporation of a zinc-containing compound to a magnesium oxychloride fire proofing cement was found to significantly increase the pot-life of the cement. The term "pot-life" as used herein refers to the length of time after mixing together the components comprising a composition of the invention in which a sufficiently constant viscosity is maintained to make it possible to coat a substantially uniform thickness of the composition using spray equipment without clogging of the equipment by cured composition. In a preferred embodiment of the invention, the magnesium oxide, magnesium chloride, and the zinc-containing compound are mixed to form the composition of the invention in amounts necessary to extend the pot-life of the system to greater than 1 hour.

The presence of a zinc-containing compound in a magnesium oxychloride cement was also found to reduce the amount of thermal popping after the composition was applied to a substrate. The term "thermal popping" as used herein refers to delamination of a coating from a substrate upon exposure of the coated substrate to very high temperature (e.g. exposure to a flame by direct impingement of the flame on the coating). In a preferred embodiment of this invention the magnesium oxide, magnesium chloride, and the zinc-containing compound are mixed to form the composition of this invention in amounts necessary to significantly reduce the amount of thermal popping. In an especially preferred embodiment the magnesium chloride, magnesium oxide, and the zinc-containing compound are mixed to form the composition of this invention in amounts necessary to obtain a value of "3" in a thermal shock test after being applied to substrate at 20 mils dry thickness and allowed to cure under ambient conditions for a period of two weeks. A rating of "3" in a thermal shock test refers to less than about 40% by surface area delamination of a coated substrate upon exposure to a butane flame for 30 seconds. "Ambient conditions" refer to a temperature of about 72° F. and about 70% relative humidity.

The amount of magnesium oxide required for the invention is about 20 to about 60 parts by weight; the preferred range is about 35 to about 45 parts by weight. The amount of magnesium chloride required for combination with these amounts of magnesium oxide is about 60 to about 100 parts by weight of an aqueous solution containing about 20% to about 35% solids. This corresponds to a specific gravity of about 1.19 to about 1.35 g/ml for the aqueous magnesium chloride solution. The preferred range of magnesium chloride is about 70 to about 90 parts by weight of the aqueous solution. The amount of the zinc compounds is about 1 to about 60 parts by weight, with the preferred range about 20 to about 50 parts by weight.

In addition to the compounds previously described, optional additives can be included to further modify the properties of the composition. These include fillers, such as fibers, including but not limited to those of wood, glass, textiles, and ceramics; thixotropic agents well known in the paint field, including but not limited to hydroxypropyl methylcellulose, silica, talc, calcium carbonate, and magnesium aluminum silicates, such as those sold under the registered trademark "Van Gel"; pigments, dyes, and tinting materials, such as titanium dioxide; impact modifiers, such as latexes; and density modifiers, such as vermiculite, perlite, and glass microballoons.

The composition of this invention can also be used in an alternative embodiment for encapsulating lead paint. In this case, a composition of the invention can be applied over a lead paint to be encapsulated to form a coating that is impervious to penetration even in the harshest environmental conditions (e.g. fire).

The substrate to be rendered fire resistant by means of the method of the invention can be any flammable object to which the composition of the invention will adhere. Examples of suitable substrates include, but are not limited to; non-woven spun bond polyester, woven fiberglass, burlap, white pine board, laminated plywood, wood panelling, one-ply doorskin, roof shingles, compressed fiberglass "board", gypsum wallboard, polyurethane foam board, iscyanurate foam board, polystyrene foam board, corrugated paperboard, and wood fiberboard.

The method in which the composition of the invention is applied to the substrate will depend on the nature of the substrate as well as the exact requirements of each application. Generally, the coatings are applied by brushing, spraying, dipping, roller coating, silk-screening or by any other convenient method. Several layers of coating can be applied on top of one another as the freshly applied layers show excellent bonding to an older base layer.

Once the composition has been applied, the coated substrate should be cured. The curing time is preferably at least 16 hours at room temperature. However, the curing time can be significantly decreased by elevating the cure temperature to 100° to 120° F.

Following curing, the composition can be overcoated with a conventional latex or oil-based paint. Although the overcoat may be flammable, the substrate treated according to the method of the invention retains its fire resistant properties. The overcoat can be either a flat, semigloss, or gloss paint, and will generally comprise: a pigment to provide the desired color; a film-forming component to provide adhesion to substrate; plasticizers to prevent cracking; and a vehicle in which the other components are suspended. The exact composition of the overcoat will depend on the exact requirements of each individual use.

This invention will be more fully understood by reference to the following Examples.

EXAMPLE 1

Increased Pot-Life

Control of and increase in pot-life is an important property of coating compositions. For example, application of the material as a coating by spraying after mixing requires maintenance of a constant viscosity over an extended period of time to provide uniform thickness and to avoid clogging of spray equipment.

To experimentally determine the pot-life of a zinc compound containing mixture relative to the pot-life of a control mixture not containing a zinc compound, the mixtures as shown in Table I were prepared and the pot-life was measured. In order to prepare the mixtures, 600 ml of a 28% by weight aqueous magnesium chloride solution (Reilly Wendover Inc.), the appropriate amount of water (as shown in Table 1), 8 ml surfactant (Lonza Inc., Amphoterge KJ-2), 4 ml defoamer (Henkel Inc., Foamaster NXZ), and 160 ml polystyrene-butadiene based latex (Union Oil Company of California, Unocal 4040) were mixed and agitated in a 2 1 beaker. To the mixture was added portionwise over 20 minutes a mixture of 400 g magnesium oxide (Magchem 30 - Martin Marrietta Inc.), the appropriate amount (see Table 1) of zinc phosphate dihydrate (Mineral Pigments Inc., Coating grade) or the appropriate amount of zinc oxide (see Table 1), the appropriate amount (see Table 1) of amorphous silica (Illinois Minerals Inc., #1240), and the appropriate amount of titanium dioxide (Kerr McGee Inc., Rutile grade). The resulting white mixture typically has a viscosity of about 60 to 70 Krebs units.

The increased pot-life of the zinc compound-containing compositions is shown in Table 1. Composition #4 through #8 have increased pot-life proportional to the concentration of zinc phosphate, relative to control composition #1 and #2, which do not contain a zinc compound. Composition #3, which also contains a zinc compound, exhibits substantially increased pot-life compared to the control.

TABLE 1

| POT LIFE (hours) OF MAGNESIUM OXYCHLORIDE CEMENTS | | | | | | | | | |
|---|---|---|---|---|---|---|---|---|---|
| | #1 | #2 | #3 | #4 | #5 | #6 | #7 | #8 | #9 |
| MgO g | 400 | 400 | 400 | 400 | 400 | 400 | 400 | 400 | 400 |
| $ZnPO_4 \cdot 2H_2O$ g | — | — | — | 50 | 100 | 200 | 300 | 400 | 300 |
| ZnO g | — | — | 200 | — | — | — | — | — | — |
| $SiO_2$ g | — | 100 | 200 | 100 | 100 | 100 | 100 | 100 | 100 |
| $TiO_2$ g | — | 40 | — | 40 | 40 | 40 | 40 | 40 | 40 |
| 28% $MgCl_2$ ml | 600 | 600 | 600 | 600 | 600 | 600 | 600 | 600 | 600 |
| $H_2O$ ml | — | 200 | — | — | 50 | 100 | 150 | 200 | — |
| Surfactant ml | 8 | 8 | 8 | 8 | 8 | 8 | 8 | 8 | 8 |
| Defoamer ml | 4 | 4 | 4 | 4 | 4 | 4 | 4 | 4 | 4 |
| Latex ml | 160 | 160 | 160 | 160 | 160 | 160 | 160 | 160 | 160 |

TABLE 1-continued
POT LIFE (hours) OF MAGNESIUM OXYCHLORIDE CEMENTS

|            | #1   | #2   | #3 | #4 | #5 | #6 | #7 | #8 | #9 |
|------------|------|------|----|----|----|----|----|----|----|
| pot-life (h) | 0.75 | 0.75 | 3  | 1  | 2  | 3  | 4  | 6  | 4  |

EXAMPLE 2

Surface Flammability

A mixture of 600 ml of a 28% by weight aqueous magnesium chloride (Reilly Wendover Inc.) solution, the appropriate amount (see Table 2) of water, 8 ml surfactant (Lonza Inc., Amphoterge KJ-2), 4 ml defoamer (Henkel Inc., Foamaster NXZ), and 160 ml polystyrene-butadiene based latex (Union Oil Company of California, UNOCAL 4040) was agitated in a 2 l beaker. To the mixture was added portionwise over 20 minutes a mixture of 400 g magnesium oxide (Magchem 30-Martin Marrietta Inc.), the appropriate amount (see Table 2) of zinc phosphate dihydrate (Mineral Pigments Inc., Coating grade), the appropriate amount (see Table 2) of amorphous silica (Illinois Minerals Inc., #1240), and the appropriate amount (see Table 2) of titanium dioxide (Kerr McGee Inc., Rutile Grade). The resulting white mixture had a viscosity of between 60 and 65 Krebs units.

The material was then sprayed on douglas fir planking using a conventional airless sprayer to a thickness of 40 mils as determined by a wet film gauge. The coating was hard and crack free after 16 hours. Measurements of tape peel at a 90° angle relative to the surface of the substrate indicated excellent adhesion to the planking. The resulting sample was tested according to the ASTM D-3806 or E-84 surface flame spread tests, which are tests that demonstrate the flammability of a surface compared to a nonflammable control, which has a surface flame spread rating of zero. ASTM E-84 is a 25-foot tunnel surface flame spread test. A low Flame Spread Index (FSI) value indicates that the material tested is flame retardant. Materials with FSI values from 0 to 25 are referred to as Class A; materials with values from 25 to 75 are referred to as Class B; and materials with values greater than 75 are referred to as Class C. ASTM D-3806 is a 2-foot tunnel surface flame spread test. It is a smaller version of the tunnel used in ASTM E-84, but the results are often predictive for the performance of materials on the ASTM E-84 test. The results are given in Table 2.

TABLE 2
SURFACE FLAME SPREAD PERFORMANCE OF DOUGLAS FIR COATED WITH ZINC-CONTAINING Mg OXYCHLORIDE CEMENT

|                         | #1  | #2  | #3  | #4  |
|-------------------------|-----|-----|-----|-----|
| MgO g                   | 400 | 400 | 400 | 400 |
| ZnPO$_4$.2H$_2$O g      | 300 | —   | —   | —   |
| ZnO g                   | —   | 200 | 400 | 200 |
| SiO$_2$ g               | 100 | 200 | —   | 200 |
| TiO$_2$ g               | 40  | —   | —   | —   |
| 28% MgCl$_2$ (ml)       | 600 | 600 | 600 | 600 |
| H$_2$O (ml)             | 150 | —   | —   | —   |
| Surfactant (ml)         | 8   | 8   | 8   | 8   |
| Defoamer (ml)           | 4   | 4   | 4   | 4   |
| Latex (ml)              | 160 | 160 | 160 | 160 |
| Latex Paint Overcoat    | NO  | NO  | NO  | YES |
| FSI ASTM E-84[1]        | —   | 20  | 15  | 20  |
| FSI ASTM D-3806[2]      | 25  | —   | —   | —   |

[1] Uncoated douglas fir control: FSI = 84 Latex paint overcoat and conventional primer on douglas fir control: FSI = 132 (median value).
[2] Uncoated douglas fir control: FSI = 77

As shown in Table 2, compositions that exhibited extended pot-life were also shown to possess Flame Spread Index values of 25 or less when applied to douglas fir. Thus, these surfaces are rated Class A and have the highest nonflammable rating for a surface according to criteria established by the National Fire Protection Association (NFPA). A Flame Spread Index of 25 or less is compared with much higher values for the douglas fir controls, demonstrating that the composition of this invention effectively reduces the surface flammability of wood when the composition is applied as a coating.

A further aspect of this invention is that the coating can be overcoated with a variety of paints while retaining the reduced flame spread properties. Thus, Example #4, Table 2, exhibits the same flame spread index as the coated douglas fir planking of Example #2, even though the coating planking of Example #4 has a "latex paint" overcoat, which is itself flammable. It is also important to note that when the latex paint is coated alone on wood or when it is used in conjunction with a standard primer, the surface flammability of the wood is increased.

WHAT IS CLAIMED IS:
1. A fluid, substantially homogeneous, aqueous mixture comprising:
   (a) magnesium oxide;
   (b) magnesium chloride in an amount sufficient to form a magnesium oxychloride cement with said magnesium oxide;
   (c) a zinc-containing, organic or inorganic compound in an amount sufficient to impart to said mixture a pot-life of about 1 hour to about 6 hours; and
   (d) water.
2. A mixture as claimed in claim 1, wherein said zinc-containing compound is an inorganic zinc-containing compound.
3. A mixture as claimed in claim 1, wherein said zinc-containing compound is a zinc halide or a zinc oxide.
4. A mixture as claimed in claim 1, wherein said zinc-containing compound is an inorganic compound of the structure "$Zn_aY_b$", wherein "Y" is a chemical moiety containing phosphorus, silicon, or boron and a heteroatom such as oxygen or sulfur, wherein a is selected from the group consisting of 1, 2, and 3, and wherein b is selected from the group consisting of 1 and 2.
5. A mixture as claimed in claim 1, wherein said zinc-containing compound is selected from the group consisting of: zinc chloride, zinc oxide, zinc borate, and zinc silicate.

6. A mixture as claimed in claim 1, wherein said zinc-containing compound is zinc phosphate.

7. A mixture as claimed in claim 1, wherein said zinc-containing compound is an organo-metallic zinc-containing compound.

8. A mixture as claimed in claim 1, wherein said zinc-containing compound is an organo-metallic compound of the structure $Zn(O_2CR)_2$, wherein R is selected from the group consisting of: H, $C_1$ to $C_4$ alkyl and phenyl.

9. A mixture as claimed in claim 1, wherein said zinc-containing compound is selected from the group consisting of: zinc formate, zinc acetate, and zinc benzoate.

10. A mixture as claimed in claims 5, 6 or 9, wherein:
  (a) said magnesium oxide is present in an amount of about 20 parts to about 60 parts by weight of the mixture;
  (b) said magnesium chloride is in the form of an aqueous solution having a specific gravity of about 1.19 g/ml to about 1.35 g/ml and the magnesium chloride solution is present in an amount of about 60 parts to about 100 parts by weight of the mixture; and
  (c) said zinc-containing compound is present in an amount of about 1 to about 60 parts by weight of the mixture.

11. A mixture as claimed in claims 5, 6, or 9, wherein:
  (a) said magnesium oxide is present in an amount of about 35 to about 45 parts by weight of the mixture;
  (b) said magnesium chloride is in the form of an aqueous solution having a specific gravity of about 1.19 g/ml to about 1.35 g/ml and the magnesium chloride solution is present in an amount of about 70 to about 90 parts by weight of the mixture; and
  (c) said zinc-containing compound is present in amount of about 20 to about 50 parts by weight.

12. A fluid, substantially homogeneous, aqueous mixture comprising:
  (a) magnesium oxide;
  (b) magnesium chloride in an amount sufficient to form a magnesium oxychloride cement with said magnesium oxide;
  (c) a zinc-containing, organic or inorganic compound in an amount sufficient to reduce the amount of thermal popping after said mixture is applied to a substrate and cured on the substrate; and
  (d) water.

13. A fluid, substantially homogeneous, aqueous mixture comprising:
  (a) magnesium oxide;
  (b) magnesium chloride in an amount sufficient to form a magnesium oxychloride cement with said magnesium oxide;
  (c) a zinc-containing, organic or inorganic compound in an amount sufficient to obtain a value of "3" in a thermal shock test after said mixture is applied to a substrate at about 20 mils dry thickness and allowed to cure under ambient conditions for a period of about 2 weeks; and
  (d) water.

14. A mixture as claimed in claim 13, wherein said zinc- containing compound is selected from the group consisting of zinc acetate, zinc benzoate, zinc chloride, zinc formate, zinc oxide, zinc borate, and zinc silicate.

15. A mixture as claimed in claim 13, wherein said zinc-containing compound is zinc phosphate.

16. A mixture as claimed in claims 14 or 15, wherein:
  (a) said magnesium oxide is present in an amount of about 20 parts to about 60 parts by weight of the mixture;
  (b) said magnesium chloride is in the form of an aqueous solution having a specific gravity of about 1.19 g/ml to about 1.35 g/ml, and the magnesium chloride solution is present in an amount of about 60 parts to about 100 parts by weight of the mixture; and
  (c) said zinc-containing compound is present in an amount of about 1 to about 60 parts by weight of the mixture.

17. A mixture as claimed in claims 14 or 15, wherein:
  (a) said magnesium oxide is present in an amount of about 35 to about 45 parts by weight of the mixture;
  (b) said magnesium chloride is in the form of an aqueous solution having a specific gravity of about 1.19 g/ml to about 1.35 g/ml and the magnesium chloride solution is present in an amount of about 70 to about 90 parts by weight of the mixture; and
  (c) said zinc-containing compound is present in an amount of about 20 to about 50 parts by weight of the mixture.

18. A method for rendering a material fire resistant comprising applying the mixture comprising:
  (a) magnesium oxide;
  (b) magnesium chloride in an amount sufficient to form a magnesium oxychloride cement with said magnesium oxide;
  (c) a zinc-containing, organic or inorganic compound in an amount sufficient to impart to said mixture a pot-life of about 1 hour to about 6 hours; and
  (d) water.

19. A method for rendering a material fire resistant comprising applying the mixture comprising:
  (a) magnesium oxide;
  (b) magnesium chloride in an amount sufficient to form a magnesium oxychloride cement with said magnesium oxide;
  (c) a zinc-containing, organic or inorganic compound in an amount sufficient to reduce the amount of thermal popping after said mixture is applied to a substrate and cured on the substrate; and
  (d) water 20. A method for rendering a material fire resistant comprising applying the mixture comprising:
  (a) magnesium oxide;
  (b) magnesium chloride in an amount sufficient to form a magnesium oxychloride cement with said magnesium oxide;
  (c) a zinc-containing, organic or inorganic compound in an amount sufficient to obtain a value of "3" in a thermal shock test after said mixture is applied to a substrate at about 20 mils dry thickness and allowed to cure under ambient conditions for a period of about 2 weeks; and
  (d) water.

21. A method for rendering a material fire resistant comprising applying the mixture comprising:
  (a) magnesium oxide;
  (b) magnesium chloride in an amount sufficient to form a magnesium oxychloride cement with said magnesium oxide; p1 (c) a zinc-containing, organic or inorganic compound in an amount sufficient to impart to said mixture a pot-life of about 1 hour to about 6 hours; and
  (d) water.

22. A method for rendering a material fire resistant comprising applying the mixture comprising:
(a) magnesium oxide;
(b) magnesium chloride in an amount sufficient to form a magnesium oxychloride cement with said magnesium oxide;
(c) a zinc-containing, organic or inorganic compound in an amount sufficient to reduce the amount of thermal popping after said mixture is applied to a substrate and cured on the substrate; and
(d) water.

23. A method for rendering a material fire resistant comprising applying the mixture comprising:
(a) magnesium oxide;
(b) magnesium chloride in an amount sufficient to form a magnesium oxychloride cement with said magnesium oxide;
(c) a zinc-containing, organic or inorganic compound in an amount sufficient to obtain a value of "3" in a thermal shock test after said mixture is applied to a substrate at about 20 mils dry thickness and allowed to cure under ambient conditions for a period of about 2 weeks; and
(d) water.

24. A method for encapsulating lead paint comprising applying the mixture comprising:
(a) magnesium oxide;
(b) magnesium chloride in an amount sufficient to form a magnesium oxychloride cement with said magnesium oxide;
(c) a zinc-containing, organic or inorganic compound in an amount sufficient to impart to said mixture a pot-life of about 1 hour to about 6 hours; and
(d) water.

25. A method for encapsulating lead paint comprising applying the mixture comprising:
(a) magnesium oxide;
(b) magnesium chloride in an amount sufficient to form a magnesium oxychloride cement with said magnesium oxide;
(c) a zinc-containing, organic or inorganic compound in an amount sufficient to reduce the amount of thermal popping after said mixture is applied to a substrate and cured on the substrate; and
(d) water.

26. A method for encapsulating lead paint comprising applying the mixture comprising:
(a) magnesium oxide;
(b) magnesium chloride in an amount sufficient to form a magnesium oxychloride cement with said magnesium oxide;
(c) a zinc-containing, organic or inorganic compound in an amount sufficient to obtain a value of "3" in a thermal shock test after said mixture is applied to a substrate at about 20 mils dry thickness and allowed to cure under ambient conditions for a period of about 2 weeks; and
(d) water.

* * * * *